(12) United States Patent
Harrison

(10) Patent No.: US 8,219,637 B2
(45) Date of Patent: Jul. 10, 2012

(54) STORAGE MANAGEMENT FOR RENDERFARM

(75) Inventor: Mark Harrison, Piedmont, CA (US)

(73) Assignee: Pixar, Emeryville, CA (US)

( * ) Notice: Subject to any disclaimer, the term of this patent is extended or adjusted under 35 U.S.C. 154(b) by 252 days.

(21) Appl. No.: 12/330,149

(22) Filed: Dec. 8, 2008

(65) Prior Publication Data

US 2009/0144402 A1    Jun. 4, 2009

Related U.S. Application Data

(63) Continuation-in-part of application No. 11/105,199, filed on Apr. 12, 2005, now Pat. No. 7,463,264.

(60) Provisional application No. 60/571,439, filed on May 14, 2004.

(51) Int. Cl.
*G06F 15/16* (2006.01)
*G06F 7/00* (2006.01)
*G06F 17/30* (2006.01)
*G09G 5/36* (2006.01)
*G06T 9/00* (2006.01)

(52) U.S. Cl. ........ 709/217; 709/218; 709/219; 707/795; 345/547; 345/555

(58) Field of Classification Search .................. 709/221, 709/217
See application file for complete search history.

(56) References Cited

U.S. PATENT DOCUMENTS

| | | | | |
|---|---|---|---|---|
| 5,752,244 A | * | 5/1998 | Rose et al. | ............................. 1/1 |
| 6,278,466 B1 | * | 8/2001 | Chen | ............................. 345/473 |
| 6,573,898 B1 | | 6/2003 | Mathur et al. | |
| 6,990,589 B1 | * | 1/2006 | Ohbayashi | ..................... 713/193 |
| 7,463,264 B2 | | 12/2008 | Harrison et al. | |
| 2004/0068652 A1 | | 4/2004 | Carpentier et al. | |
| 2004/0199867 A1 | * | 10/2004 | Brandenborg | ............. 715/500.1 |
| 2005/0097287 A1 | * | 5/2005 | Melament et al. | ............. 711/162 |
| 2005/0155079 A1 | * | 7/2005 | Chen et al. | ..................... 725/115 |
| 2007/0005389 A1 | * | 1/2007 | Apparao et al. | ................... 705/1 |

OTHER PUBLICATIONS

Cook et al., "The Reyes Image Rendering Architecture," Computer Graphics, vol. 21, No. 4, 1987, pp. 95-102.

* cited by examiner

*Primary Examiner* — Jeffrey Pwu
*Assistant Examiner* — Shaq Taha
(74) *Attorney, Agent, or Firm* — Kilpatrick Townsend & Stockton LLP; Philip H. Albert

(57) ABSTRACT

Systems and methods for storing assets in storage systems external to asset management systems while still allowing the asset management systems to track the stored assets are disclosed. One method begins by first receiving an asset to be stored in an asset management system. Next, a first location on a storage managed by the asset management system is determined. A second location on a storage system external to the asset management system is then determined. The external storage system has been configured to store the asset. The asset is then stored at the second location. A logical link is then determined to the second location. Finally, the logical link is stored at the first location. The disclosed systems and methods allow for an administrator to separate the storage methods used by asset management systems from the asset tracking and logging capabilities of asset management systems.

23 Claims, 12 Drawing Sheets

PATH CALCULATION EXAMPLE:

ASSUME 29 AVAILABLE PARTITIONS IN A STORAGE FARM

ASSUME COMPUTATION: d(n) = MD5(n) MODULO 256

ASSUME COMPUTATION FUNCTION MAPPING IS MODULO 29

FOR SHOT "DAVID"
    d(n) = MD5 ("DAVID") MODULO 256
         = 1
    f(d) = 1 MODULO 29
         = PARTITION 1

FOR SHOT "JEFF"
    d(n) = MD5 ("JEFF") MODULO 256
         = 102
    f(d) = 102 MODULO 29
         = PARTITION 15

STORAGE MANAGEMENT FOR RENDERFARM

CROSS-REFERENCES TO RELATED APPLICATIONS

The present application is a continuation-in-part of U.S. patent application Ser. No. 11/105,199 filed Apr. 12, 2005, now allowed. U.S. patent application Ser. No. 11/105,199, in turn, claims priority to U.S. Provisional Application No. 60/571,439, filed May 14, 2004. The above-listed applications and U.S. patent application Ser. No. 10/810,487, filed Mar. 26, 2004, are hereby incorporated in their entirety for all purposes.

BACKGROUND

The present invention relates to asset management systems.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cells. After painting, each cell would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with the appearance of the scene, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-generated animation (CG animation) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), and others. In addition to creating animated features, Pixar developed computing platforms specially designed for CG animation, and CG animation software now known as RenderMan®. RenderMan® was particularly well received in the animation industry and recognized with two Academy Awards®. RenderMan® renders images based upon conceptual "animation assets" including files that describe a scene, that describe an object, and the like.

Scenes to be rendered are typically specified (assembled) by many users, including animators, lighters, shaders, modelers, technical directors, and the like. These scene descriptor files typically includes descriptions of other animation assets including objects, camera angles, lighting sources, and the like in a single file.

Drawbacks to having a single scene descriptor file include other animation assets include that only one user could work on a scene at a time. Another drawback included that objects that are included in multiple scenes had to be stored within each scene descriptor file, thus wasting memory.

To address these drawbacks, Pixar developed an internal technique for segmenting a scene descriptor file from one large file into a series of smaller files. As described in the co-pending application described above, Pixar developed and used the concept of "hook set" files and references to "hook files" to describe a scene, a "shot" (a series of related scenes) and the like. As such, a typical scene descriptor files is composed of references to a number of separate object data files. Accordingly, an object could be stored once, but used and referenced in more than one scene. Additionally, different users could modify different objects in a scene at the same time.

One method for providing access to animation assets to many different users has been with the use of a centralized file server, sometimes in the form of an asset management system. By using an asset management system, the proliferation of different versions of animation assets were controlled and the consistency of animation assets in different scenes was improved. In such systems, the asset management system received requests from client computers for animation assets, and in response, the asset management system would locate the animation asset and provide the asset to the client computers. Over time, the assets tracked by asset management systems have expanded to include not just animation assets, but any other file or piece of data that may be useful for a given project. For example, assets may include digital photographs, text files, and even abstract assets, such as assets that track human resources. Asset management systems typically receive an asset name and asset data from one or more client computers. Additionally, various asset management systems also track various pieces of metadata associated with the asset along with the asset data itself. For example, some asset management systems may maintain detailed information chronicling the evolution of an asset as it is modified by various authors over time. The asset management system may track metadata that helps to show the differences between checked-in versions of a given asset, comments added by various authors, and the like. In some asset management systems, the metadata may be limited to metadata created by an operating system or an application associated with the asset. Such metadata may include data on when the asset was first created or when the asset was last modified.

FIG. 8 is a block diagram of a typical asset management system. The diagram shows how asset management systems are commonly used in the prior art.

In FIG. 8, a set of clients 900 have access to two distinct asset management systems 1000 and 1010. Client 910, for example, can access assets 1003 located in a storage resource 1003 controlled by the asset management system 1000. Typically, the client 910 will use the asset management system's application programming interface (API) 1001 to gain access to the assets 1003. Similarly, other clients can access assets stored in asset management systems using the appropriate API. APIs 1001 and 1011 may be distinct from each other with a completely different set of available commands that can be issued against their respective asset management systems.

As is shown in FIG. 8, any client wishing to access assets stored in an asset management system generally uses the respective APIs to gain access. Direct access to any stored assets is usually forbidden in an asset management system. One rationale for limiting access to assets is that asset management systems are typically designed so that changes in the asset are carefully managed, tracked, and capable of being undone in case a problem is caused by the change in the asset. The asset management system, in essence, stores its assets in a black box and allows access to its assets via the API of the asset management system.

The inventors have determined that drawbacks to a centralized server for managing a file storage system includes that it is a single point of failure and slowness. For example, if the centralized server were down, no access to animation assets could be performed and the entire animation process would halt. This would last until the server were brought back up. Another drawback was that a centralized server scaled poorly with increasing number of clients, leading to a performance bottleneck. For example, because a centralized server could server only one request at a time, if five clients requested the same animation asset, the last client would have to wait until the first four clients were served.

Another problem with current asset management systems is that asset management systems often do not allow clients to have much, if any, control over how assets are stored within an asset management system. As a result, various inefficiencies may arise, especially when large asset are being managed by the asset management system. It is currently very difficult to allow asset management systems to manage certain aspects of the assets while simultaneously exerting any significant control over how the asset management system actually stores the assets. There are instances where it may be desirable to separate the storage functionality offered by asset management systems from the tracking and logging capabilities offered by asset management systems.

Accordingly what is desired is an improved method and apparatus for asset management, without the drawbacks described above.

SUMMARY

The present invention relates to asset management systems.

Certain embodiments of the invention enable high speed distributed access to and management of a centralized file storage without passing through a central file software server. Some embodiments of the invention address downtime and performance problems related to centralized server software and hardware failure and slowness.

Novel aspects of embodiments of the present invention include that, embodiments do not rely upon a centralized software server for storing or retrieving data from a data store. Another novel aspect is that operation is ensured even when more than one software client attempts to perform the same operation on the same or different software asset. Another novel aspect is a unified mapping of animation asset files for client and application programs, even though the actual animation asset files may reside on different computers, disk drives, and the like. Yet another novel aspect is that disk farm operations may occur in parallel over multiple clients (e.g. an entire render farm) rather than being performed sequentially on a central server. Another novel aspect includes that the state of the disk files and file systems cannot be modified directly by a client program, but via an access program on the same client computer. Additionally, client programs can access all information about and data contained in files managed on the disk farm, but can only change the state of the disk farm or of any file on the disk farm by making requests to the access program (e.g. disk farm management program). Yet another novel aspect of the invention includes the ability to separate the storage methods used by asset management systems from the asset tracking and logging capabilities of asset management systems.

According to one aspect of the invention, a method for serverless animation asset data management of a storage network is described. One technique includes receiving an animation asset identifier in a first computer system, receiving animation asset data associated with the animation asset identifier in the first computer system, and determining a storage resource in the storage network for storage of the animation asset data, in the first computer, in response to a path determination algorithm and in response to the animation asset identifier, wherein the determination in the first computer of the storage resource is made substantially free of interaction with the storage network. One process includes storing the animation asset data from the first computer on the storage resource in the storage network, and creating a logical link between the animation asset identifier and the storage resource in the first computer system. Various techniques also include receiving the animation asset identifier in a second computer system, determining the storage resource in the storage network where the animation asset data is stored, in the second computer, in response to the path determination algorithm and in response to the animation asset identifier, wherein the determination in the second computer of the storage resource is made substantially free of interaction with the storage network and made substantially free of interaction with the first computer system, and creating a logical link between the animation asset identifier and the storage resource in the second computer system.

According to another aspect of the invention, a serverless file management system is disclosed. One apparatus includes a centralized storage comprising a plurality of storage resources, wherein each storage resource from the plurality of storage resources are configured to store animation asset data and configured to provide the animation asset data, and a plurality of client systems coupled to the centralized storage, wherein each of the plurality of client systems comprises a client program and a service program. In some systems, the client program is configured to specify at least one animation asset identifier, the service program is configured to receive the animation asset identifier from the client program, and the service program is configured to determine a storage resource from the plurality of storage resources associated with the animation asset identifier, in response to the animation asset identifier and in response to a path calculation algorithm. Additionally, the determination is made substantially free of interaction with the centralized storage. In this apparatus, the service program is configured to determine whether a directory path in the storage resource has been created, the service program is configured to create the directory path in the storage resource, if the directory path has not been created, and the service program is configured to create a logical link between the animation asset identifier and the directory path in the storage resource.

According to yet another aspect of the invention, a method for providing serverless access to a storage system of shared animation assets is described. One method includes, receiving in a first system a shared animation asset identifier, determining in the first system a shared resource from the storage system that stores animation asset data associated with the shared animation asset identifier, in response to the shared animation asset identifier and in response to a path algorithm, wherein the determination is made substantially free of communication with the storage system, and receiving in a second system the shared animation asset identifier. A process also includes determining in the second system the shared resource from the storage system that stores animation asset data associated with the shared animation asset identifier, in response to the shared animation asset identifier and in response to the path algorithm, wherein the determination is made substantially free of communication with the storage system, and is made substantially free of communication with the first system. The technique may also include directly accessing from the first system, the animation asset data in the shared resource, and directly accessing from the second system, the animation asset data in the shared resource. In various embodiments, the first system accesses the animation asset at a time independent of when the second system accesses the animation asset data.

According to yet another aspect of the invention, a method for a computer system is described. One method includes, receiving an asset to be stored in an asset management system, determining a first location on a storage managed by the asset management system, determining a second location on a storage system external to the asset management system, wherein the external storage system is configured to store the asset, storing the asset at the second location, determining a logical link to the second location, and storing the logical link at first location.

According to another aspect of the invention, a file management system is disclosed. One apparatus includes an asset management system wherein the asset management system is configured to store assets and to retrieve assets, a storage network comprising a plurality of storage systems external to the asset management system, a plurality of client systems configured to store assets to and retrieve assets from the asset management system, and a computer system configured to recognize when an asset is being added to the asset management system and configured to store assets on the plurality of storage systems on the storage network. The computer system is configured to receive the asset to be added to the asset management system. The computer system is configured to determine a location for the asset on one of the plurality of storage systems on the storage network. The computer system is configured to store the asset at the determined location on one of the plurality of storage systems on the storage network. The computer system is configured to determine a logical link to the determined location on one of the plurality of storage systems on the storage network. The computer system configured to store the logical link at a second location within the asset management system.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF EXEMPLARY EMBODIMENTS

Figure 1:
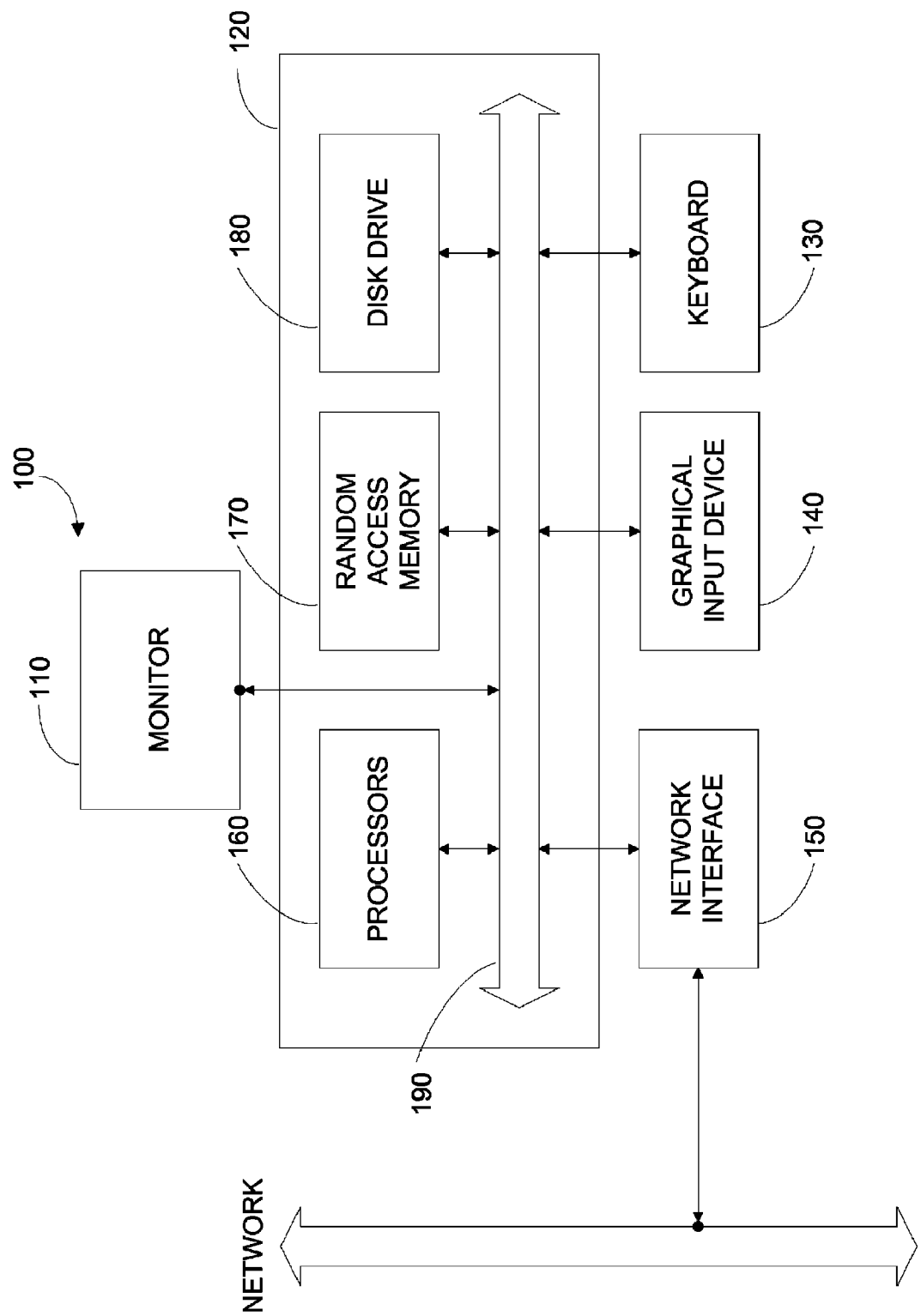
FIG. 1 illustrates a block diagram of a computer system according to one embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text, control points and the like that appear on the monitor 110. In some embodiments, monitor 110 and user input device 140 may be integrated, such as with a touch screen display or pen based display such as a Cintiq marketed by Wacom.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of animation asset data, audio/video files, computer programs, operating system, embodiments of the present invention, including hook files, a client application program, a service or access program (e.g. a disk farm management program), and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer systems capable of embodying the present invention. It will be readily apparent to one of ordinary skill in the art that many other hardware and software configurations are suitable for use with the present invention. For example, the use of other microprocessors are contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Additionally, graphics processing units (GPUs) may also be used. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2:
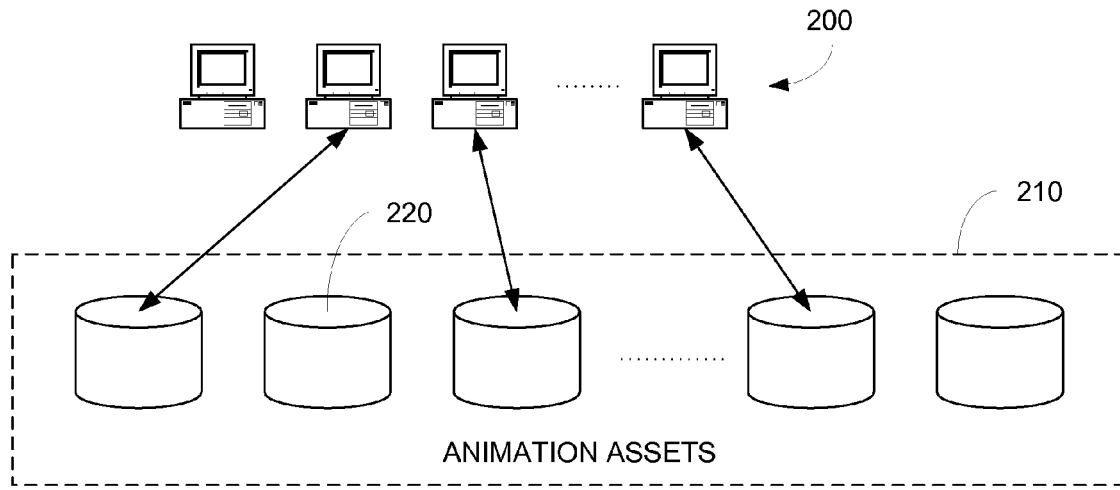
FIG. 2 illustrates a block diagram of an embodiment of the present invention.

FIG. 2 illustrates a block diagram of an embodiment of the present invention. Specifically, FIG. 2 illustrates computer systems 200 and a storage network or "storage farm" 210.

In the present embodiments, computer systems 200 may be embodied as computer system 100 in FIG. 1. In embodiments of the present invention, computer systems 200 specifies and retrieves animation asset data from storage resources 220 of storage farm 210. In the present embodiments, computer systems 200 directly accesses storage system resources 220 of the storage farm 210, without a centralized file management server.

In the present embodiments, storage system resources 220 of storage farm 210, typically store animation asset data in organized and repeatable ways. For example, in one embodiment, storage system resources 220 include simple flat-directory structures, or the like for storage of animation assets. In various embodiments, in computer systems 200, the directory locations of animation assets in storage system resources 220 are be specified by absolute file path locations, relative file paths, specific directories, aliases, UNIX "symlinks," shortcuts, uniform resource locators, and the like.

In one embodiment of the present invention, a scene descriptor file or other animation asset is requested within a client system, e.g. computer system 200. In various embodiments, the scene descriptor files are typically text files that specifies additional animation assets within the scene. Animation assets may include lighting objects, camera objects, geometric objects, and the like. These objects are used to specify the scene for rendering or other purposes. In the present embodiments, the scene descriptor file also specifies the position of objects in the scene, the orientation of objects, the colors and textures for the objects, properties for objects, and the like. In the present invention, the scene descriptor file is a textual file referred to as a "hook set" or "hook file." A scene descriptor file may be associated with only the frame to be rendered, may be associated with a "shot" of images, may be associated with a portion of a feature, may be associated with the entire feature, or the like. In other embodiments, other types of representation of a scene descriptor can be used with embodiments of the present invention.

An example of the content of a simple hook file may include the following text references to a camera object, a light object, and a (three-dimensional) object:

```
hook "camera1" {properties of camera 1};
hook "light1" {properties of light 1};
hook "object1" { properties of object 1};
```

In one embodiment, for a camera object, properties may include: type of projection (e.g. perspective); field of view; width; position; azimuth; pitch, pan, and roll; aspect ratio; focusing option; cropping; shifting; tv aspect ratio, pan and scan option, number of tracks, number of cranes, and the like. An example of a portion of a camera hook is as follows:

```
hook "main_cam" {
    desc = main_cam: production camera, aka camera01a;
    kind = camera;
    filename = stdobj/Camera01a.m;    (filename of camera model) ...
```

As seen in this example, reference to a file including a specification of a camera model is illustrated as a ".m" file. The .m file is accessed from storage farm 210 and used when rendering the scene using the camera object. In embodiments of the present invention, other file types for objects are contemplated, such as model files compatible with other three-dimensional creation and manipulation programs, such Maya, SoftImage, or the like.

In another embodiment, for a light object, properties may include: light quality, light type, light shape, light color, and the like. Not all camera objects or light objects need to support the same properties. For example, an "atmospheric fog light" may have a unique fog properties. An example of a portion of a lighting object hook is as follows:

```
hook "LP_Lspt_onPodium" {
    use "stdlight/glight01a/glight01a.hook";
    kind = light;
    class = _Clsss_Glight01a;
    macro = glight01a(name);
    filename = stdlight/glight01a/glight01a.m;    (filename of light model)
```

As seen in this example, reference to a file including a specification of a light model is also illustrated as a ".m" file. The .m file is accessed from storage farm 210 and used when rendering the light object in the scene, for any other purpose.

In embodiments of the present invention, geometric objects may include three dimensional descriptions of objects, such as an animated character (e.g. Bob, Marlin, Woody), a prop (e.g. a table, a chair), and the like. Additionally, geometric objects may include virtually any imaginable properties supported. For example, one geometric parameter may be: number of wheels for an automobile object; number of eyeballs for a monster object, or other animation variable, and the like. Additionally, a geometric object may include references to files including physical models. An example of a portion of a geometric object hook is as follows:

```
hook "object1"    {full_model = "object1_full.mdl";
                   number_of_legs = 4;
```

-continued

```
standin_model = "object1_standin.mdl";
number_of_legs = 1;
....}
```

In this example, a first geometric description file is specified "object1_full.mdl" and a second geometric description file is also specified "object1_standin.mdl." These respective .mdl files are accessed from storage farm 210 and used when rendering the geometric object in the scene, or any other purpose. In the present embodiment, each model descriptor file is an industry standard .mdl file that specifies how object1 is to be rendered or appear in the scene. In other embodiments, the model descriptor files may include procedurally generated geometric components, procedurally generated textures, and the like. In still other embodiments, combinations of both pre-defined and procedurally generated aspects of object1 may be used.

In embodiments of the present invention, the .mdl files may store pre-defined geometric components, shaders, textures, colors, or the like. In other embodiments of the present invention, the .mdl files may themselves be "aggregate assets" that include references to other animation assets such as: geometric components, shaders, and the like, that are separately stored.

In embodiments of the present invention, the animation assets referred to in hook files may be "hard coded" storage locations. However, for sake of flexibility, the animation assets referred to in hook files are not hard coded. Instead, as will be illustrated below, using embodiments of the present invention, the physical location of animation assets are determined by a client system, using a unique mapping algorithm, when the animation asset is required.

Figure 3:
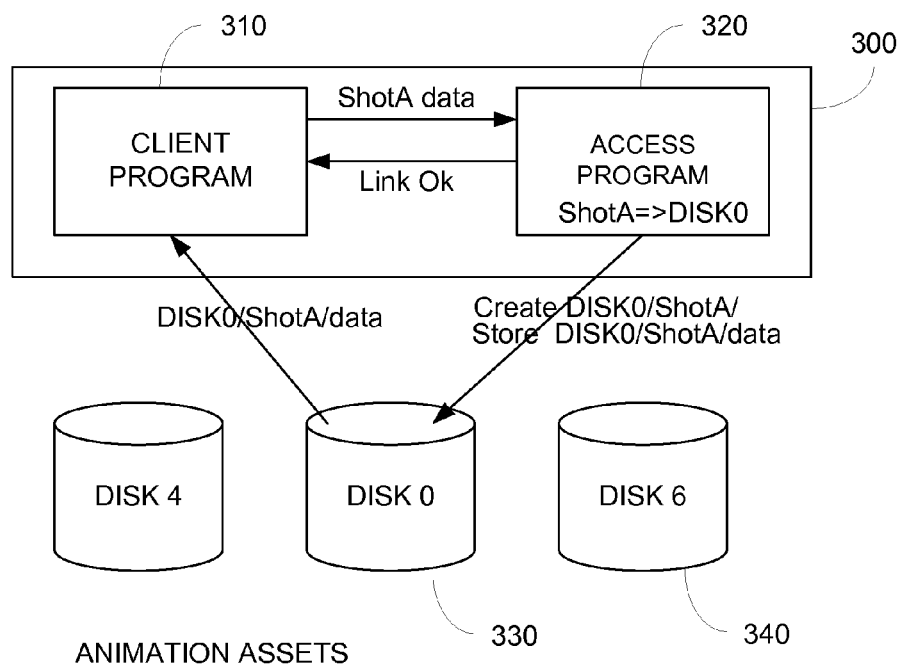
FIG. 3 illustrates another embodiment of the present invention.

FIG. 3 illustrates another embodiment of the present invention. In FIG. 3, a typical client system 300 is shown including a client application program 310, and an access program (service program) 320. Further, client system 300 is shown coupled to a storage system resources 330 and 340.

In the example shown in FIG. 3, data stored in directories of storage system resource 330 can be directly accessed by client system 300. More specifically, such data can be directly accessed based upon pre-determined and calculated directory paths, as will be described below.

In embodiments of the present invention, client application program 310 can directly read animation asset data using a determined directory path for an animation asset, however typically only access program 320 can modify the animation asset data. For example, in embodiments of the present invention, access program 320 selects storage system resource 340 for storage, creates the path within storage system resource 340, and stores animation asset data in storage system resource 340. Additionally, as will be discussed below, access program 320 typically creates a local symbolic link between an animation asset identifier (e.g. name, filename, version) to the path to storage system resource 340. As shown in FIG. 3, when client application program 310 specifies the animation asset identifier, the animation asset linked to the path within storage system resource 340.

Figure 4A:
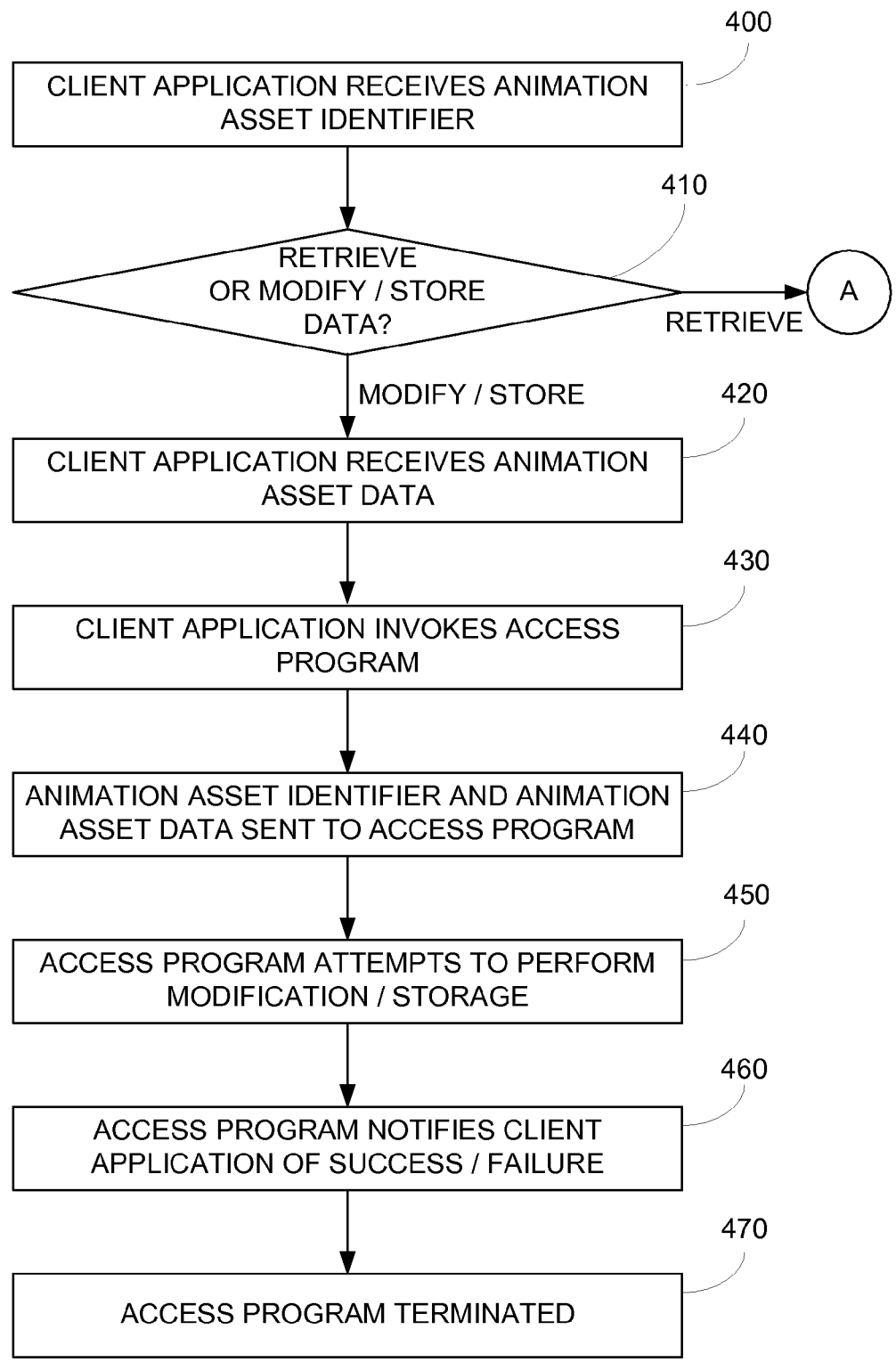
FIG. 4A-B illustrate a block diagram of a flow process according to an embodiment of the present invention.
Figure 4B:
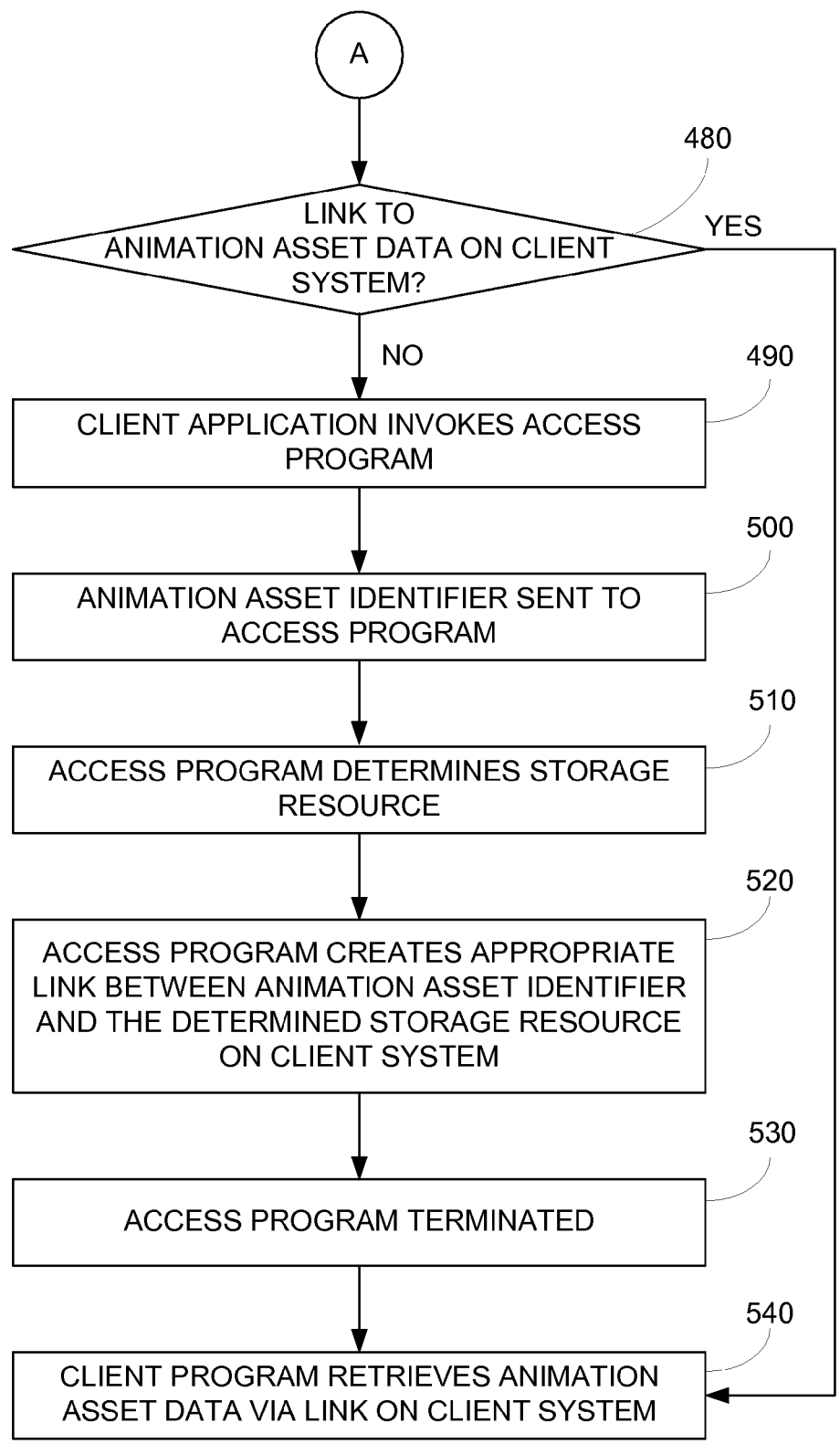

FIG. 4A-B illustrate a block diagram of a flow process according to an embodiment of the present invention. More specifically, FIGS. 4A-B illustrate operation of a client application program 310 and access program 320 on a typical client system.

Initially, the client application program receives an animation asset identifier, step 400. The animation asset identifier may include an animation asset name, such as a "shot" name, an object name, and the like; may also include a version identifier, such as "final version," "version 1.0," "Shading version," and the like; additionally, the animation asset identifier may also include a portion of a directory path, such as "/usr/assets/characters/david.mdl," "stdlight/glight01a/glight01a.m," and the like. In various embodiments, the animation asset identifier may be specified within a hook file, as illustrated above, directly entered or specified by a user, or the like.

Next, a determination may be made as to whether the client application wants to retrieve the animation asset, or change the status of the animation asset, step 410. For example, the user of the client application may wish to perform a number of actions for the animation asset, such as modify an animation asset, define an animation asset, lock an animation asset, simply copy out the animation asset, review the status of the animation asset, or the like.

In the present embodiment, if the wishes to change the status of the animation asset, the client application typically receives data from the user specifying how the animation asset will be changed, step 420. Examples of this include modifying properties, modifying status, defining the animation asset, and the like.

In FIG. 4A, the client application next invokes a copy of a access program, described in FIG. 3, for accessing the storage farm, step 430. After the access program is invoked, the client application typically provides the animation asset identifier and data specifying how the animation asset will be changed to the access program, step 440.

In response to these data, the access program performs the operations on the storage farm, step 450. A more detailed explanation of operations that occur in this step will be given below. Next, the access program reports the success or failure of the operations on the storage farm back to the client application, step 460.

If successful, in the present embodiment, the client application then terminates the access program, step 470.

In embodiments of the present invention, if the client application merely wishes to retrieve the animation asset, the client application determines whether a logical link between the animation asset identifier and the storage system resource storing the animation asset (within the storage farm) exists, step 480. For example, the client application determines whether a symbolic link has been defined in the operating system for the animation asset identifier. In some operating systems, such logical links may be referred to as symlinks, aliases, shortcuts, and the like.

In the case a logical link does not exist for the animation asset, the client program again spawns the access program, step 490, and provides the animation asset identifier to the access program, step 500.

Next, in response to the animation asset identifier, access program performs a path determination algorithm to determine a storage system resource from the storage farm, step 510. In various embodiments of the present invention, what is typically returned in this step is the identification of a path to a specific storage system resource. Further details regarding path determination algorithms will be illustrated below.

Next, in various embodiments, a logical link is then created on the client system between the animation asset identifier and the path to the specific storage system resource, step 520. As an example, if the animation asset identifier includes a path "/dev/characters/caroline/caroline.mdl" and the path to the specific storage system resource is "disk_12_1," a logical link is then created between "/dev/characters/caroline/caroline.mdl" and "disk_12_1/dev/characters/caroline/caroline.mdl."

In embodiments of the present invention, once the logical link is created, the access program is terminated, step 530. Subsequently, when the client program refers to the animation asset identifier, the logical link in the operating system directs the client program to the specific storage system resource, step 540. Continuing the example above, when the client requests the file "/dev/characters/caroline/caroline.mdl," as specified by a hook file, for example, the animation asset data is retrieved from "disk__12__1/dev/characters/caroline/caroline.mdl."

Figure 5:
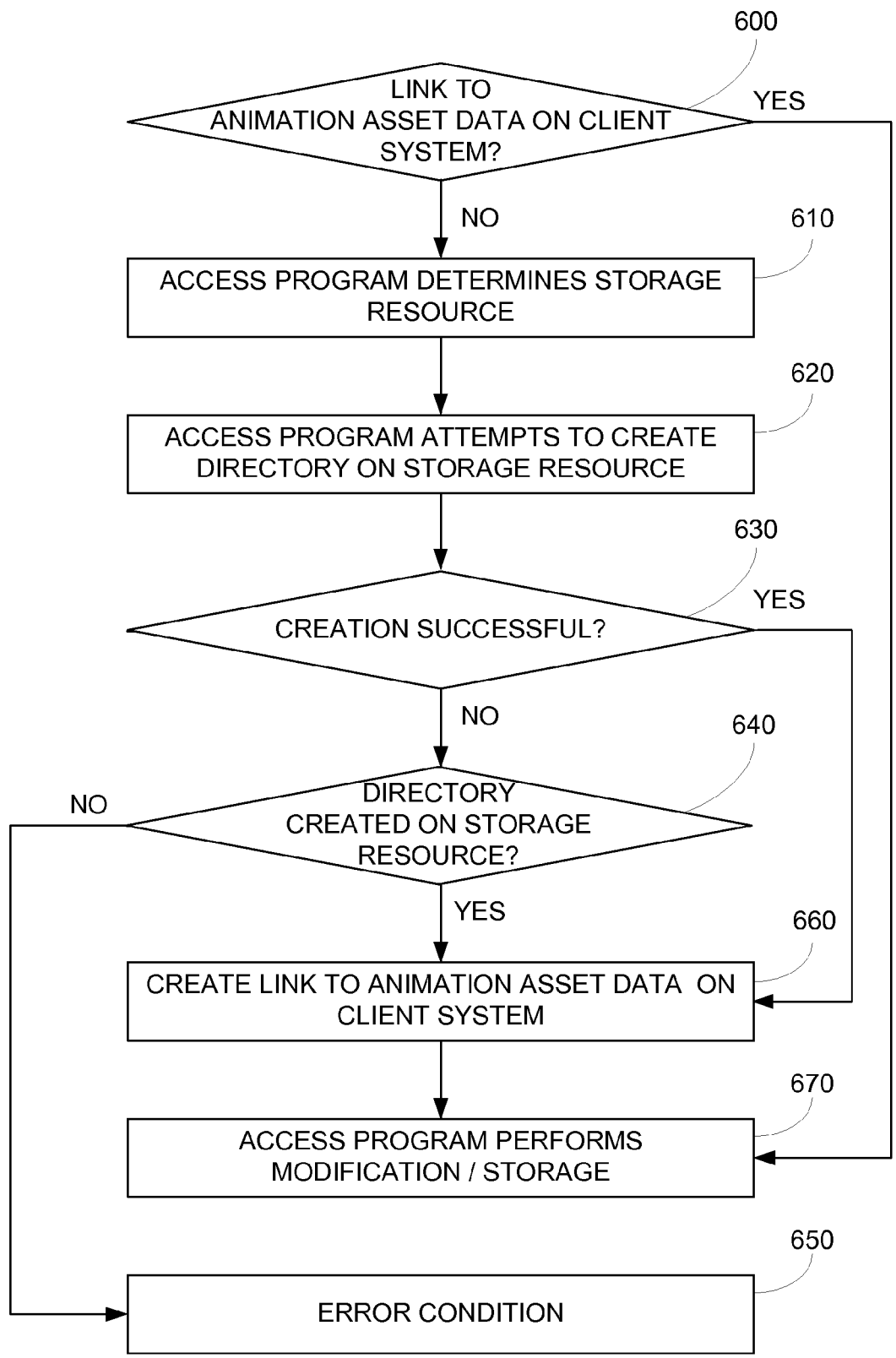
FIG. 5 illustrates a block diagram of a flow process according to an embodiment of the present invention.

FIG. 5 illustrates a block diagram of a flow process according to an embodiment of the present invention. More specifically, FIG. 5 illustrates a process for the access program to perform operations on the storage farm.

In this embodiment, initially, the access program determines whether a logical link exists between the animation asset identifier and a specific storage system resource, step 600. This process may be performed by the access program determining whether a symbolic link exists at the operating system level in the client system. In other embodiments, a textual list, or the like may be stored on client system indicating which animation assets identifiers have associated paths.

In embodiments of the present invention, if no logical link exists at this stage, it is assumed that the animation asset identifier is currently being defined. In such a case, the next step is for the access program to perform a path determination algorithm to determine a storage system resource from the storage farm, where the animation asset will be stored, step 610. In various embodiments of the present invention, what is typically returned in this step is the identification of a path to a specific storage system resource. Further details regarding path determination algorithms will be illustrated below.

In embodiments of the present invention, the access program attempts to create a directory path on the specific storage system resource for storage of the animation asset, step 620. For example, if the specific storage system resource is "disk__7__16" and directory path for the animation asset is "/dev/characters/jeff," in this step, the access program attempts to create the directory path "disk__7__16/dev/characters/jeff." A determination is then made as to whether the path creation was successful or not, step 630.

As illustrated in FIG. 5, if the on-resource directory path creation fails, the access program of the present client system determines whether the directory path already exists, step 640. In embodiments of the present invention, this determination is made because other client systems may have already created the on-resource directory path for the animation asset, but the present client system does not a logical link to the specific storage system resource or directory path. In cases where the on-resource directory path does not exist, an error condition is returned, step 650. In cases where the on-resource directory path exists, a logical link is then created on the client system between the animation asset identifier and the path to the specific storage system resource, step 660.

Next, the access program modifies the state of the animation asset data stored in the specific storage system, using the data provided by the client program, step 670. In embodiments of the present invention, the modification may include creation of the animation asset, changing of data, changing of version numbers, changing on-resource directory, and the like.

In various embodiments of the present invention, the success or failure of the modification requests, are then returned to the client program, in step 460 in FIG. 4A.

Figure 6:
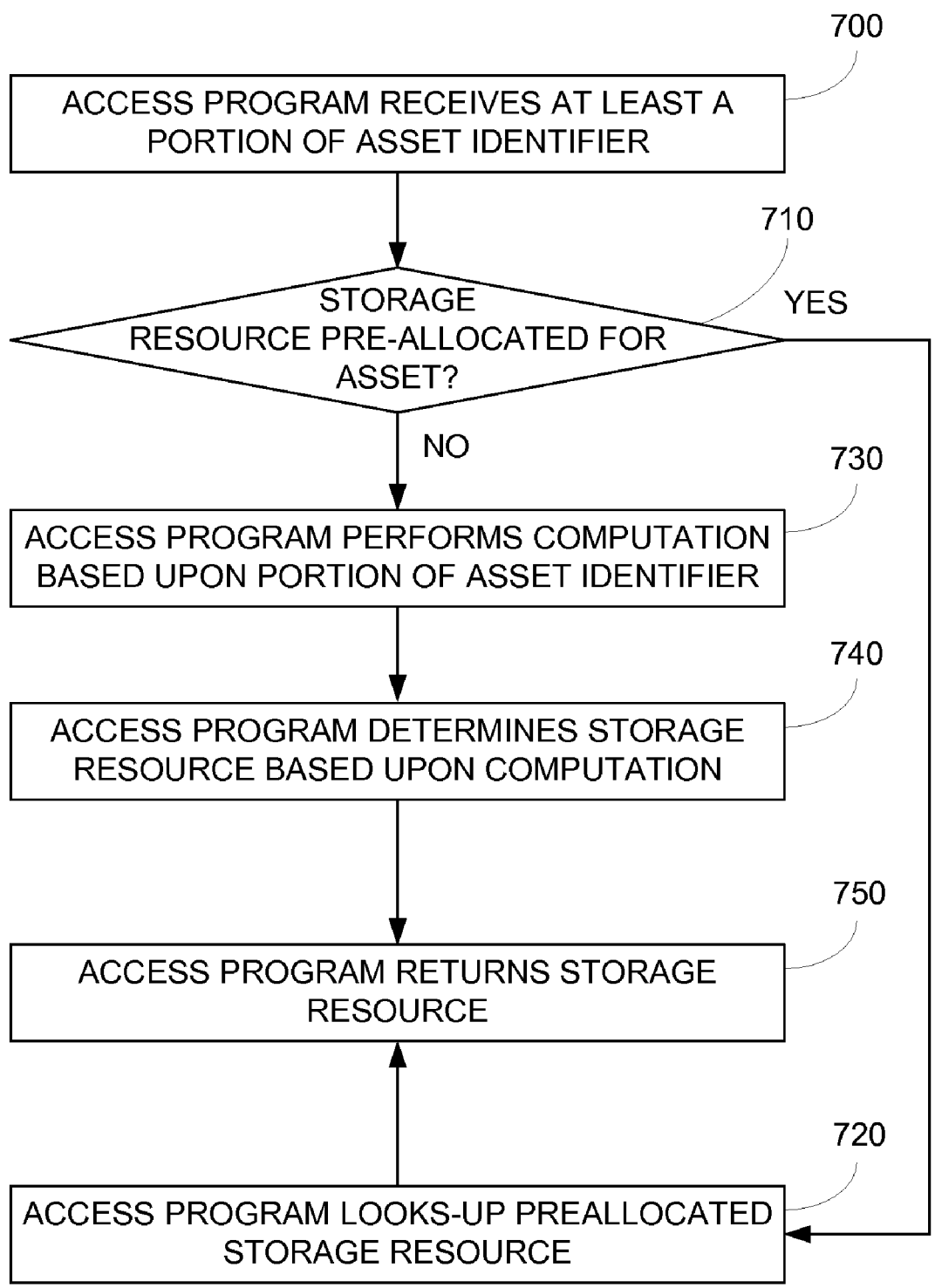
FIG. 6 illustrates a block diagram of a flow process according to an embodiment of the present invention.

FIG. 6 illustrates a block diagram of a flow process according to an embodiment of the present invention. More specifically, FIG. 6 illustrates a process for the access program to determine a specific storage system resource from the storage farm, using a path determination algorithm.

In some embodiments of the present name, at least a portion of the animation asset identifier is determined, step 700. As examples, the portion of asset identifier may include the name, such as a character name, e.g. "Jeffrey;" a "shot" name, e.g. "opening credits;" a version identifier, e.g. "production," "v.2.1;" and the like.

Next, in various embodiments, the access program determines whether a storage system resource has been pre-allocated for the animation asset, step 710. In various embodiments, specific animation assets may be pre-allocated to certain reserved storage system resource for a variety of reasons, such as controlled access, based upon size of the reserved storage system resource memory, and the like. In various embodiments, a pre-allocation list may be pushed to all the client systems which list the animation assets that are pre-allocated. Accordingly, in this step, the access program may simply refer to this list. In other embodiments, a central pre-allocation list may reside at a predetermined location, and the access programs review this list from the predetermined location.

In embodiments where an animation asset has a pre-allocated reserved storage system resource, the storage system resource is determined, step 720.

In various embodiments of the present invention, as illustrated in FIG. 6, if the storage system resource is not pre-allocated, access program initially performs a message digest computation based upon at least a portion of the asset identifier, step 730. In other embodiments, different types of calculations may be performed, such as a hash function, or other logical and mathematical function.

Next, based upon the results of the calculation in step 730, a modulo function is performed to determine which storage system resource is to be selected, step 740. In various embodiments of the present invention, the base for the modulo function is the same as the number of storage system resources in the storage farm. For example, if there are 12 different storage system resources, e.g. 12 hard disk drives, in the storage farm, in this step, the function is modulo 12. In other embodiments, the modulo may be different, for example, if particular storage system resources are reserved and pre-allocated. In other embodiments of the present invention, other types of functions may be performed to determine a mapping.

Based upon the storage system resource that is selected, the access program determines the storage system resource, step 750. In various embodiments, the mapping between the numerically selected resource in step 740, and the path to the storage system resource may be stored in a file local to the access program, or at a centralized location.

Figure 7:
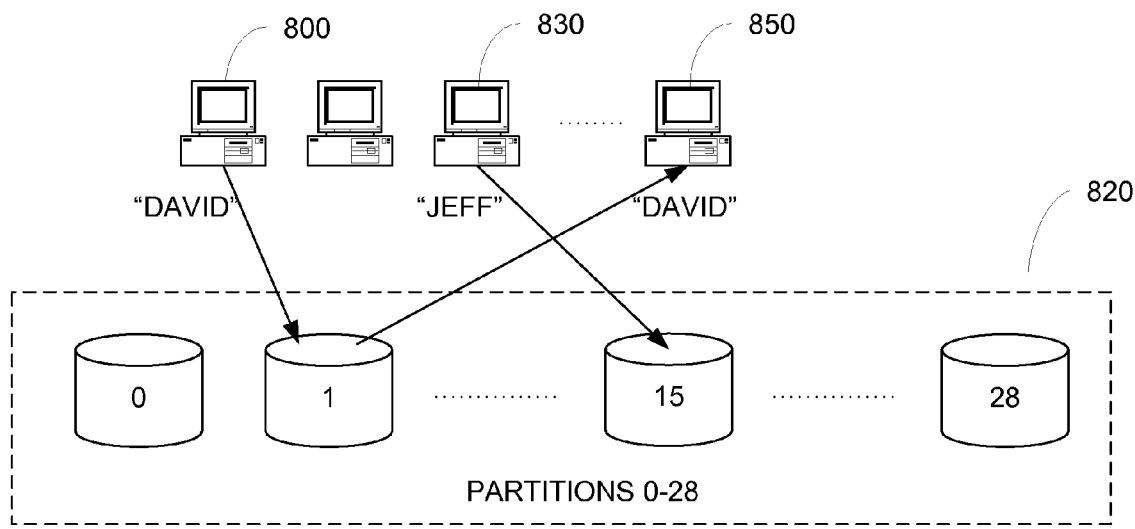
FIG. 7 illustrates an example according to an embodiment of the present invention.
Figure 8:
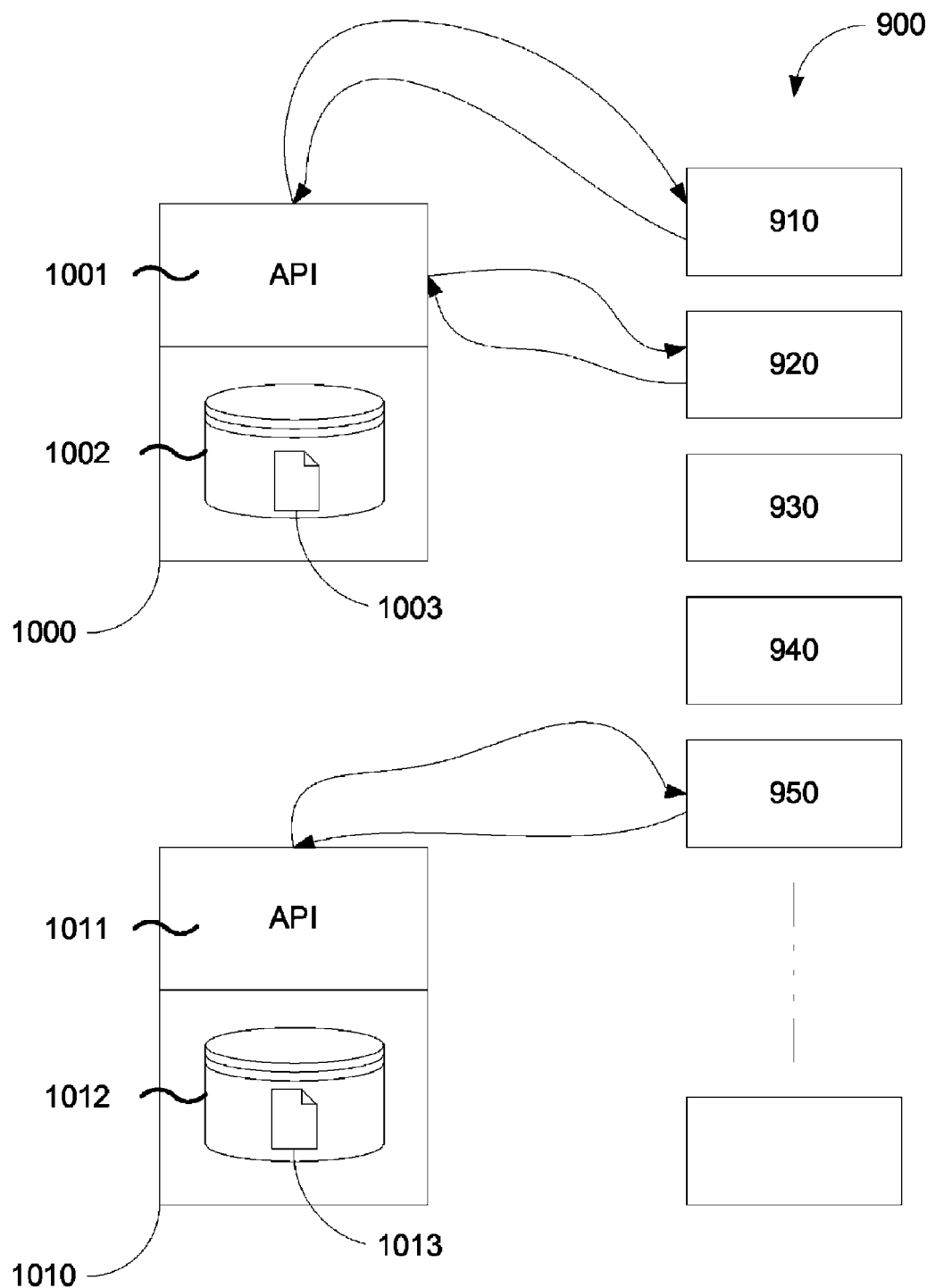
FIG. 8 illustrates a block diagram of a prior art system.

FIG. 7 illustrates an example according to an embodiment of the present invention. More specifically, FIG. 7 illustrates a path calculation example for two different animation assets.

In FIG. 7, a first client system 800 wants to store animation asset 810 in a storage farm 820 and a second client system 830 wants to store animation asset 840 in storage farm 820. In this example, storage farm 820 includes logical disk partitions 0 to 28, or 29 partitions.

In this example, the check sum computation of step 730 includes a conventional Message Digest 5 hashing function, or MD5( ). In this example, the hash function returns a 128-bit number, thus the number is processed modulo 256 to obtain a smaller (e.g. 8-bit) number. Then, because there are 29 partitions in this example, the modulo function is modulo 29 in step 740.

In the example in FIG. 7, the digest of the check sum is first performed on the names of the animation asset, and then the resulting number is passed modulo 29. As a result, as shown, animation asset 810 is designated to be stored in partition 1, and animation asset 840 is designated to be stored in partition 15. More generally, in this embodiment, the mapping uses the function f(d)=c(d) modulo n, where d is the animation asset identifier (e.g. shot name), c(d) is a digest checksum function, and n is the number of partitions available in the storage network.

Subsequent to the storage of these animation assets in the respective partitions 15, a third client system 850 may wish to retrieve animation asset 810. In this example, again, the digest of the check sum is first performed on the name of the desired animation asset. Next, the resulting number is passed modulo 29, and as a result, disk partition 1 is identified. Then, as described above, third client system 850 determines the path to disk partition 1, and creates a symbolic link between the desired animation asset and the path to disk partition 1.

According to the above embodiments, multiple client systems can operate without intervention of a central storage server when accessing animation asset data. Further the client systems can operate virtually independent from each other when accessing animation asset data. Further, multiple client systems can operate without intervention of a central storage server when modifying the state of animation asset data (e.g. creating, editing, updating animation asset data. Additionally, the client systems can operate virtually independent from each other when modifying the state of the animation asset data. For example, as illustrated in FIG. 2, access programs arbitrate between themselves, in part by performing step 640. In this way, if a first access program beats a second access program in a "race condition" to create a directory structure for a new animation asset, the second access program uses the directory structure created by the first access program.

In various embodiments of the present invention, the storage network described above may be any method for storing and retrieving animation asset data, for example, the storage network may be a RAID array, a geographically or logically distributed storage network, a magnetic hard disk, an optical disk, a series of asset management systems or database systems, and the like.

Many changes or modifications are readily envisioned. In light of the above disclosure, one of ordinary skill in the art would recognize that many variations may be implemented based upon the discussed embodiments. For example, in various embodiments, the inventors have determined that it is often desired to keep related versions of an animation asset on the same storage system resource. For example, working versions of a particular animation asset, prototypes of the particular animation asset, finalized versions of the particular animation asset, and the like are often desired to be stored on a common disk partition. Such animation assets typically include a common asset animation identifier, such as an animation asset name, in addition to other descriptors that describe the specific version. As an example, for a shot is named "opening_credits," a completed shot, ready for Director review may be named "take_opening_credits_5."

In some embodiments, of the present invention, a number of file-name filters may be preset within the access program. The filters may be used to separate the animation asset name from the version (given) name. For example, a given name for an animation asset is "take_opening_credits_5." After file-name filtering, the access program determines the basic animation asset name (identifier) is "opening_credits." Next, as described above, the animation asset name "opening_credits" is hashed to determine the specific storage system resource.

The specific storage system resource is then used to store "take_opening_credits_5." Accordingly, in this example, "take_opening_credits_5" is stored in the same disk partition as "opening_credits," because the mapping algorithm uses the same input data, "opening_credits" and "take_opening_credits_5."

In other embodiments of the present invention, any number of asset animation pre-fixes or suffixes may be used for a variety of purposes. As an example, the prefixes or suffixes may be used to segregate important data from less important data.

In embodiments of the present invention, a number of temporary animation asset data may be stored with the storage system along with finalized data, such as the "take" data above. However, because finalized data (e.g. take" data) is very important to keep, it is often desired to store such important data in more robust or reliable types of storage (e.g. RAID) within a storage system. Conversely, temporary animation asset data (e.g. preliminary computations) are less important to maintain, and may be regenerated, if lost.

In light of this, in various embodiments, name modifiers may be attached to distinguish more important and less important data. For example a "temp" or a "scratch" prefix or suffix may be added to a temporary file, and/or a "final," "take," or the like prefix or suffix may be added to an important file. Then, when the access program determines that an animation asset identifier has a "temp" or "scratch" prefix, the access program stores that animation asset in a different location from where a "final" animation asset is stored. As an example, an access program may be programmed to recognize an animation asset identifier such as "temp_Doobie_character" as a temporary file of the "Doobie" animation asset, and/or "final_Doobie_character" as a final file of the same animation asset.

One way to do this, is to divide the storage network into two or more parts for storing the less important and/or more important data. For example, a storage system includes storage partitions 0-24 that are reserved for more important data, and storage partitions 25-49 that are reserved for less important data. Using this arrangement, access programs may perform the mapping based upon the animation asset name, and then add a modifier depending upon whether the file is a temporary file or a final file. In the example above, a "Doobie_character" name may be hashed and mapped modulo 25 to partition 20. Then, if the animation asset is not a temporary file, it will then be stored in partition 20. However, if the animation asset is a temporary file, a predetermined offset of 25, for example, is added to the partition number. Thus, the file "temp_Doobie_character" will be mapped or offset, in this example, to partition 45 (i.e. 20+25), where as "final_Doobie_character" will be mapped to partition 20.

Many other different ways to differentiate and store related animation assets in common or different locations are envisioned. As an example, "final" or important versions of assets may have an offset, whereas less important versions will not have such an offset. As another example, for temporary assets, the mapping algorithm may always map to an even partition number, and final files are mapped to odd partitions, and the like. In various embodiments, the same types of determination may also be made when storing or retrieving data from memory.

Figure 9:
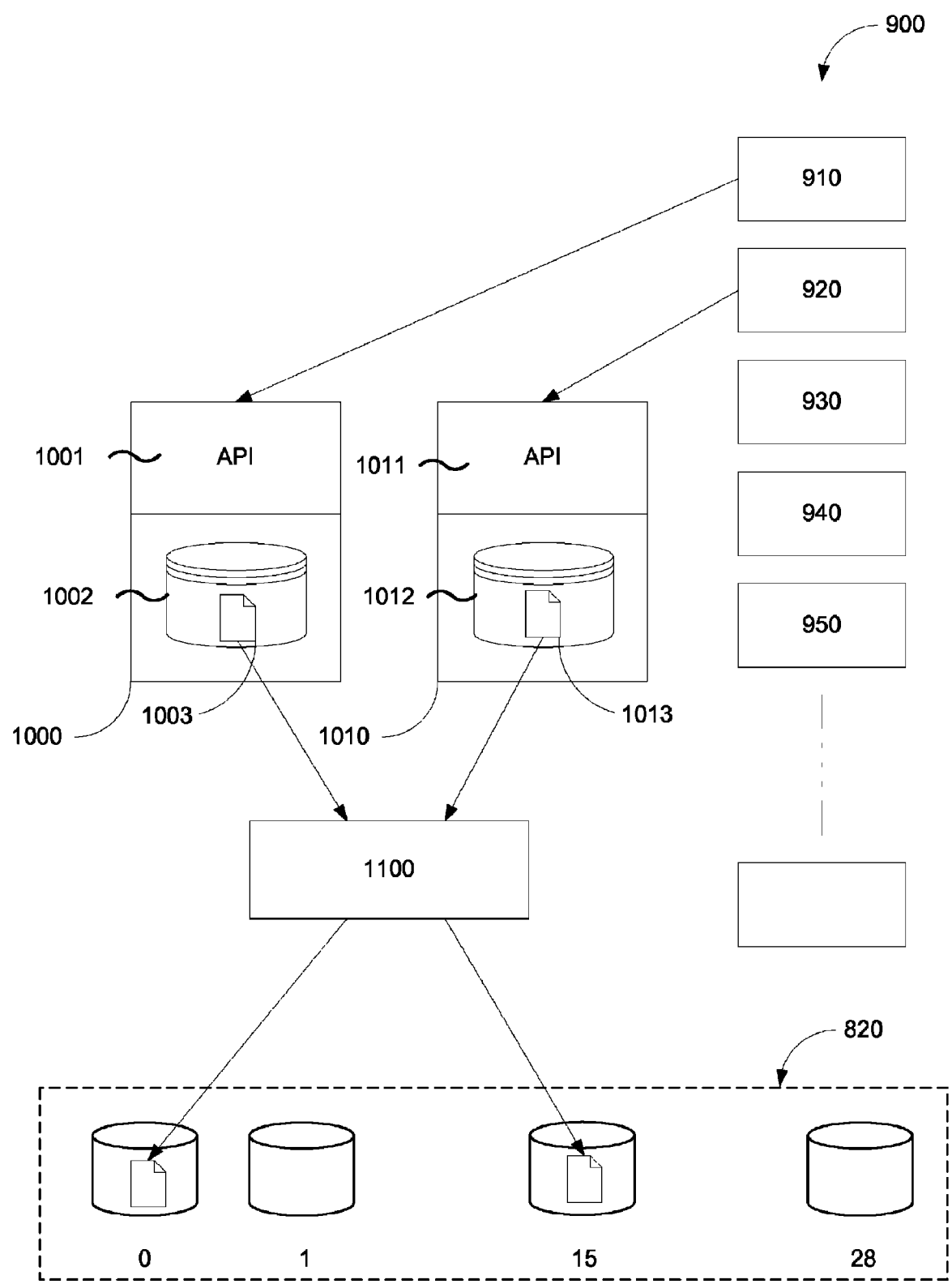
FIG. 9 illustrates a block diagram of an embodiment of the present invention.

FIG. 9 is a block diagram of one example embodiment of the present invention. More specifically, FIG. 9 illustrates a system where assets to be stored in various asset management systems are stored on storage systems external to the asset management systems.

The embodiment illustrated in FIG. 9 shows a set of clients 900 accessing asset management systems 1000 and 1010 using the appropriate API for each system. In particular, the embodiment illustrated in FIG. 9 shows clients 910 and 920 in the process of adding new assets to asset management systems 1000 and 1010 using APIs 1001 and 1011.

In a typical asset management system, the assets to be stored in the system would be stored in a storage space managed by the asset management system. For example, asset management system 1000 can store the assets somewhere within storage space 1002, and asset management system 1010 can store assets within storage space 1012.

The asset management systems illustrated in FIG. 9 have been configured to communicate with an asset management program 1100. In some embodiments, the asset management program 1100 runs its own computer system. The asset management program 1100 is capable of storing assets received by asset management systems 1000 and 1010 in an storage space external to the asset management systems. In FIG. 9, the asset management program 1100 is configured to store assets in a storage farm 820. In this example, storage farm 820 includes logical disk partitions 0 to 28 for a total of 29 separate partitions. The storage farm 820 represents one example of a storage system that is external to asset management systems 1000 and 1010. The various logical disk partitions that make up the storage farm 820 may comprise many different or heterogeneous storage systems. Other embodiments may use other types of well-known storage devices or mechanisms that are external to the asset management systems.

An asset management system, such as asset management systems 1000 and 1010, may communicate with the asset management program 1100 in a variety of different ways according to various embodiments. For example, in some embodiments, the asset management program 1100 may be running on the same computer as an asset management system. The asset management program 1100 may then receive a message from the asset management system using any one of a variety of well-known means. In other embodiments, the asset management program 1100 may reside on a computer separate from an asset management system. In these embodiments, a communication between an asset management system and the asset management program 1100 may take place over a network that communicatively links the asset management system and the asset management program 1100.

In some embodiments, the asset management systems are configured so that when a client attempts to add an asset to an asset management system, an interrupt is triggered that sends a message to the asset management program 1100. In some embodiments, the message sent to the asset management program 1100 indicates that an asset is about to be added to an asset management system. The message can be generated by the asset management system itself if the asset management system can be configured to support this sort of messaging functionality. In various embodiments, the message may contain information identifying the asset that has been added, the data that makes up the asset, and potentially other information concerning the added asset. Similarly, a message can be generated and sent to the asset management program 1100 when an asset is modified or deleted in an asset management system. Such a message may include the information that overlaps with an "add" message. The message may also include information not found in an "add" message. For example, an update message may include information identifying the type of change that has occurred.

If an asset management system is not capable of generating a message indicating that an asset is about to be added to the system, then alternative methods may be used to create an appropriate message. For example, some embodiments may use a program that sits on top of the API of the asset management system. This program can monitor the commands issued to the asset management system, and the program can thus detect when an asset is about to be added, deleted, updated, etc. When a triggering event, such as an add, is detected, the program can generate a message that indicates an asset is about to be added. This message can be sent to the asset management program 1100. In some embodiments, the asset management program 1100 itself act as the program that sits on top of the API of an asset management system. In some other embodiments, the storage space managed by an asset management system may be monitored by a program in a manner so that the program can determine when an asset is about to be or has been added, deleted, updated, etc., to an asset management system. Then, for example, when the program determines that an asset is about to be or has been added to an asset management system, a message indicating this event can be sent to the asset management program 1100.

Once the asset management program 1100 is notified that an asset is about to be added to an asset management system, the asset management program 1100 can then determine the appropriate storage location for the asset within the storage farm 820 or other storage external to the asset management system. In some embodiments, a path determination algorithm, such as the one disclosed in reference to FIG. 6, may be used to determine the storage location of the asset.

Once the storage location within storage farm 820 is determined, the asset can be stored at that location by the asset management program 1100. In addition to storing the asset, the asset management program 1100 may also create any appropriate directories needed to store the asset at the asset's the storage location.

Next, a logical link to the stored asset can be created by the asset management program 1100. As described earlier, a logical link may be an operating system link or other means to access to the stored asset.

The logical link created by the asset management program 1100 can then be given to an asset management system as a substitute for the asset. In other words, an asset management system can store the logical link at the location in the storage managed by the asset management system where the asset would have been stored if the asset management system had stored the asset without any interference from the asset management program 1100. The logical link can be stored in the storage of the asset management system in whatever manner is appropriate for the asset management system. In some embodiments, the asset management system stores the logical link in the storage space managed by the asset management system. In some embodiments, the logical link is stored in the storage space managed by the asset management systems by the asset management program 1100 itself.

Figure 10:
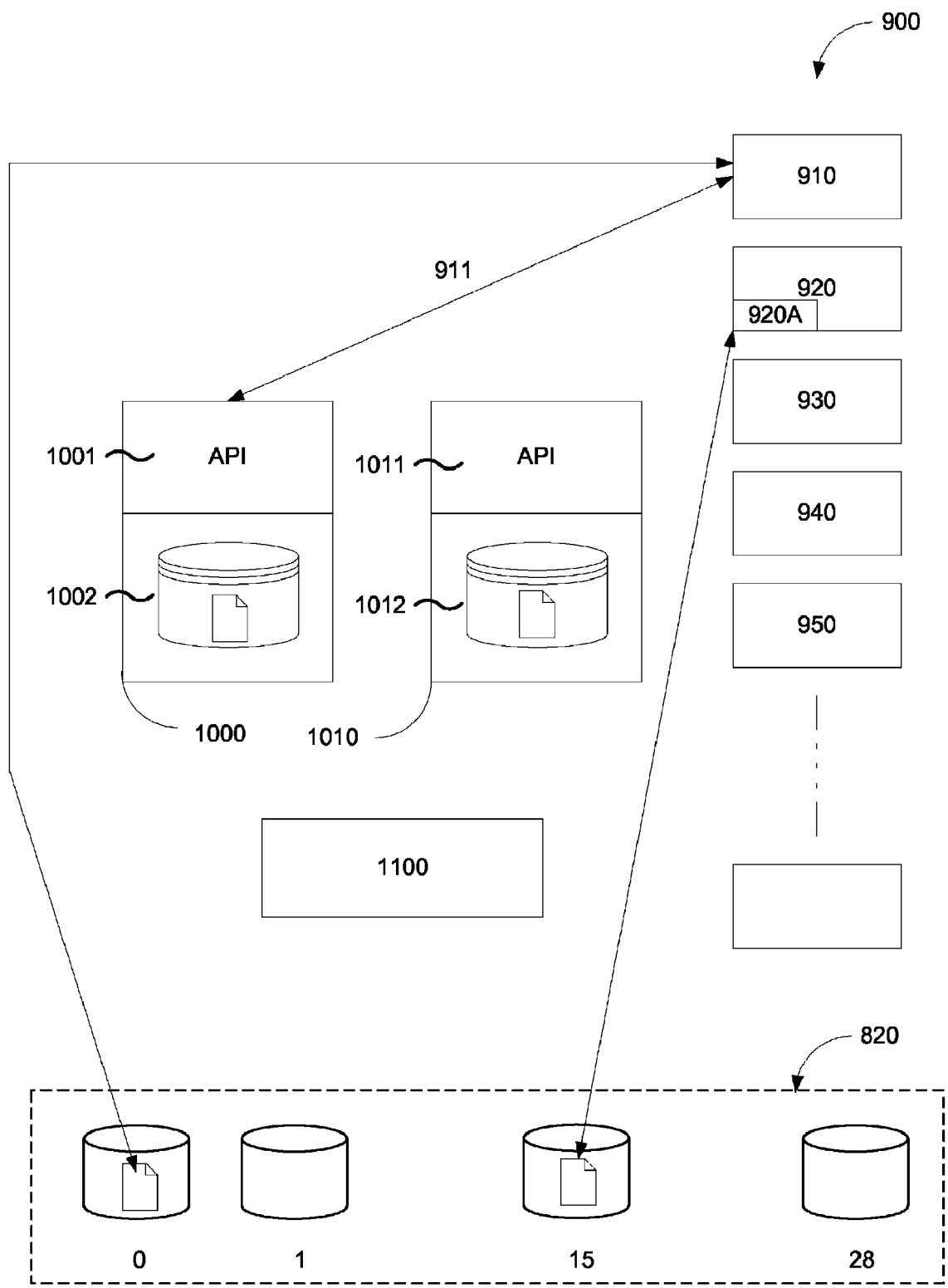
FIG. 10 illustrates a block diagram of an embodiment of the present invention.

FIG. 10 is a block diagram of one example embodiment of the present invention. More specifically, FIG. 10 illustrates a system where the assets stored on an external storage network are accessed.

In some embodiments, accessing assets managed by asset management systems but stored externally from the asset management system is completed transparently to both the clients 900 and the asset management system.

In FIG. 10, client 910 requests an asset from asset management system 1000. This request is represented by arrow 911 between client 910 and API 1001. The client 910 then receives a link to the asset that is stored by the asset management system 1000. The asset management system 1000 returns the link to the asset as if the asset management system 1000 was returning the asset itself. The asset management system 1000 is able to do this because the link to the asset is stored in the location where the asset was intended to be stored when the asset was added to the asset management system 1000.

Client 910 may then use the received link to access the asset. This is represented by arrow 912 between client 910 and partition 0 of storage farm 820. In some embodiments, the logical links stored by the asset management system 1000 are OS links. As illustrated in FIG. 10, client 910 can use the logical link to access the asset without further use of the asset management system 1000.

Client 920 can also access assets stored in the storage farm 820. In FIG. 10, client 920 does not send any request to an asset management system, such as asset management system 1010, in order to access assets. Instead, client 920 may use a client application and/or an access application, represented by program 920A, to access assets. As disclosed above in reference to FIGS. 2-7, client and access programs allow clients to access assets without using a centralized server, such as asset management system 1000 or 1010.

In some embodiments, the asset management program 100 may not be involved at all in the accessing process. As illustrated in the embodiment illustrated in FIG. 10, asset management program 1100 is not used to access the assets accessed by client 910 or client 920.

Figure 11:
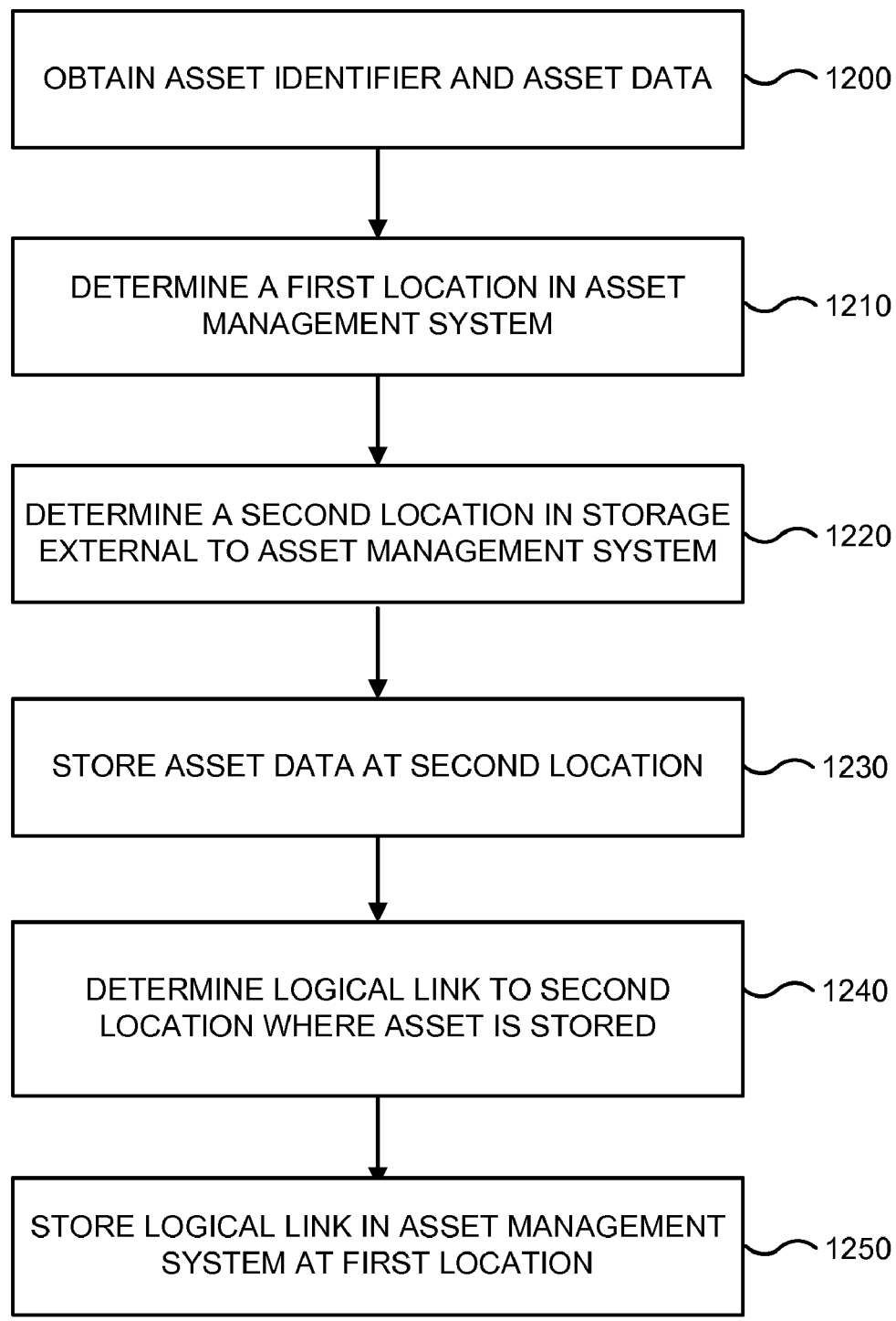
FIG. 11 illustrates a block diagram of an embodiment of the present invention.

FIG. 11 is a flow diagram according to various embodiments of the present invention. More specifically, FIG. 11 illustrates the steps involved in storing an asset in a storage system external to an asset management system according to one embodiment.

At step 1200, an asset identifier and asset data are obtained. In some embodiments, an asset identifier and asset data are originally obtained by an asset management system through the a command issued against the asset management system by a client. The command may include the asset identifier and information locating the asset data. The asset management system may then use the information locating the asset data to obtain the asset data itself. This information can then be later forwarded to an asset management program, such as asset management program 1100 illustrated in FIG. 9.

At step 1210, a first location where the asset is to be stored in the asset management system is determined. In various embodiments, the asset management system will determine the disk location for the asset in the asset management system using the standard procedures for determining the disk location for an asset in the asset management system. This first location can later be forwarded to an asset management program.

At step 1220, a second location for the asset in storage external to the asset management system is determined. In some embodiments, this step is accomplished through the use of a program that is external to the asset management system, such as an asset management program. The asset management system may send a message to this program indicating that an asset is about to be stored within the asset management system, and the message may also include information identifying where within the asset management system the asset will be stored. Other information, such as the asset identifier or other meta data associated with the asset, may also be included in the message. Once this message from an asset management system is received by an external program, the external program may then determine the on-disk location of the asset in the storage external to the asset management system. In some embodiments, the secondary storage may be in the form of a disk farm. In some embodiments, the external program may need to request additional information from the asset management system before determining where the asset is to be stored. In some embodiments, the location may be determined as a function of the asset identifier, metadata associated with the asset, or any other appropriate path determination algorithm.

At step 1230, the asset is stored at the determined second location in the storage external to the asset management system. In some embodiments, the asset may be stored without any additional requests to the asset management system. In some embodiments, an asset management program may need to request the asset data from the asset management system. In some embodiments, an asset management program may copy the asset from the location where the asset management has already stored the asset to the second location in the storage external to the asset management system.

At step 1240, a logical link to second location in external storage is determined. In some embodiments, the logical link may comprise a simple text file indicating the partition and directory where the asset has been stored in the external storage. In other embodiments, the logical link may comprise an operating system link. For example, the common "ln" or "symlink" commands in UNIX environments may be used to create a link to the asset as it is stored on the external storage. One skilled in the art will recognize that there are many possible ways to create a link to the asset stored on the external storage.

At step 1250, the logical link create at step 1240 is stored in asset management system at the first location. At the conclusion of this step, the asset management system stores a link to the asset at the location originally allocated for the storage of the asset itself. In some embodiments, an asset management program gives the asset management system the logical link as a substitute for the asset itself. In some embodiments, an asset management program may directly access the storage space managed by the asset management system and store the logical link at the first location.

Figure 12:
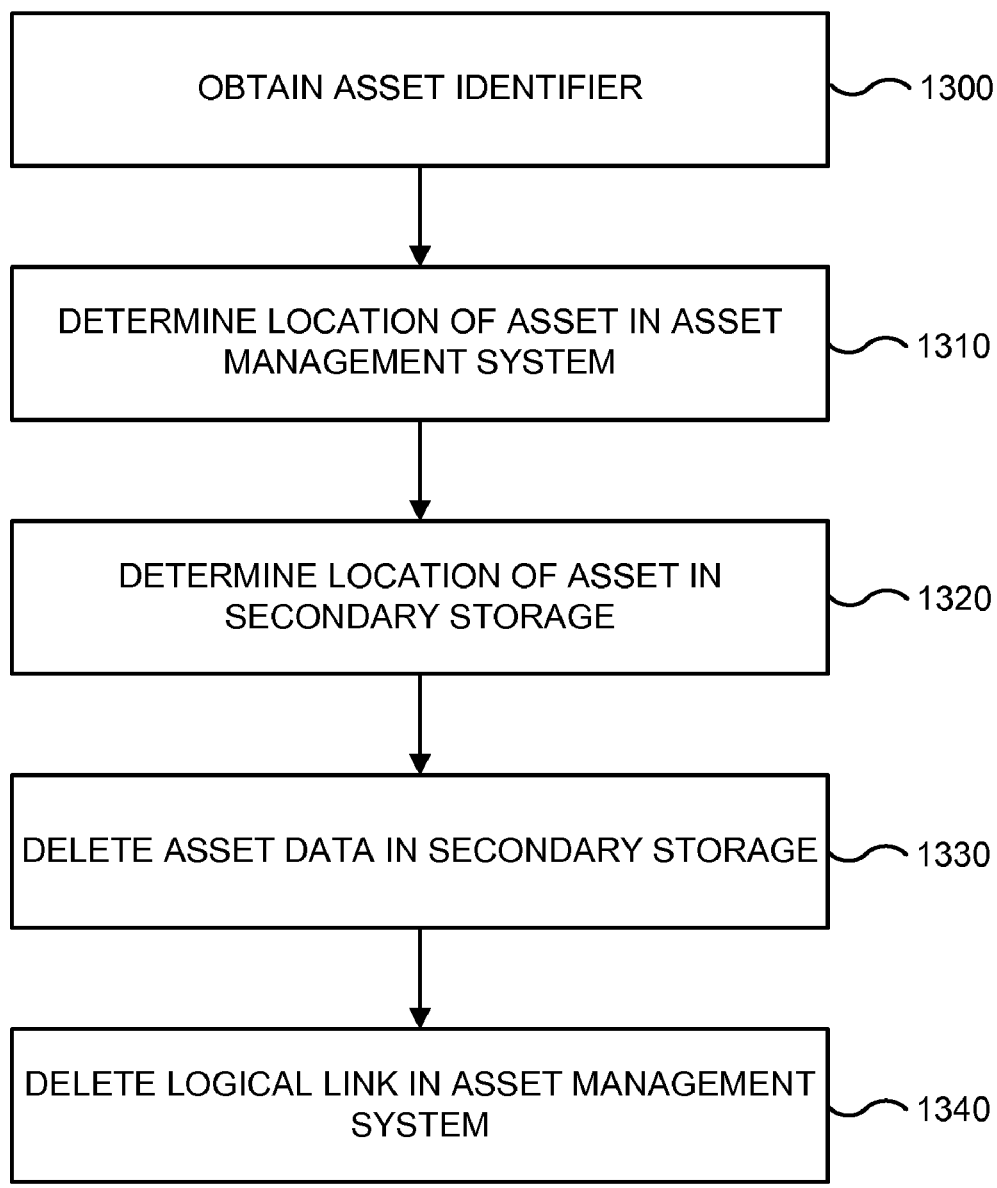
FIG. 12 illustrates a block diagram of a flow process according to an embodiment of the present invention.

FIG. 12 is a flow diagram according to various embodiments of the present invention. More specifically, FIG. 4 illustrates the deletion of an asset.

At step 1300, an asset identifier is obtained. This asset identifier identifies the asset that is to be deleted. In some embodiments, an asset identifier is obtained when a deletion command is issued to an asset management system.

At step 1310, the on-disk location of asset in asset management system is determined. In some embodiments, the location of the asset in the asset management system is determined by the asset management system. If the asset has been stored in the asset management system according to methods such as those presented in FIG. 11, then the asset management system will only contain a link to the asset stored on a secondary storage that is external to the asset management system.

At step 1320, the on-disk location of asset in secondary storage is determined. In some embodiments, this location may be determined by the logical link stored in the asset management system. In other embodiments, this location may be determined by using a path determination algorithm. A path determination algorithm used to determine the location of the asset will typically be the same path determination algorithm used to identify the location of the asset stored in secondary storage when the asset was added to the asset management system. In some embodiments, the determination of where the asset is stored in secondary storage may be determined by a client system to the asset management system. In other embodiments, the location of the asset in secondary storage may be determined by an asset management program external to the asset management system.

At step 1330, the asset in secondary storage is deleted. In some embodiments, this step is accomplished by executing the appropriate delete command against the secondary storage where the asset is stored. For example, in some embodiments, a UNIX "rm" command or "unlink" command may be appropriate.

At step 1340, the logical link in the asset management system is deleted. In some embodiments, this step may be carried out in a manner similar to step 1330. In other embodiments, this step may be carried out by letting an asset management system delete the logical link stored in the asset management system in the manner the asset management system typically deletes assets stored in the system.

In some asset management systems, an update to an asset is treated in largely the same manner as the addition of a new asset but with a link between the old version of the asset and the new version of the asset. For these asset management systems, an update can be treated in a similar manner as an add, and the updated asset can be stored in storage external to the asset management system using the above-described methods.

In light of the present disclosure, one of ordinary skill in the art will recognize that the concepts disclosed above can be expanded beyond the framework of asset management systems. For example, one skilled in the art will recognize that the above-described methods could be used to create a virtual file system. A file system driver could be modified to alert an program similar to an asset management program whenever an asset is added, updated, or deleted. The alerted program could then store the file in a storage space external to the file system managed by the file system driver. A logical link to the file could then be stored by the file system driver at the location where the file was originally going to be stored. Using these methods, a single namespace can be created that links to assets stored on a wide variety of potentially heterogeneous storage systems.

Additionally, in light of the present disclosure, one of ordinary skill in the art will recognize that the concepts disclosed above can be applied to applications outside of managing assets and rendering images associated with those assets. For example, various other data processing applications, such as data mining applications, metadata extraction applications, file verification applications, etc., may benefit from separating the storage of the assets from the other features offered by asset management systems. For example, data mining applications may benefit from being able gain faster access to assets while avoiding the potential bottleneck of the asset management systems. As another example, applications that only need metadata associated with assets can access the metadata without interfering with the ability of other clients to access the data of the assets.

By separating the storage of assets from the other capabilities of asset management systems, a number of improvements to the storage and management of assets can be realized. For example, clients can easily access assets without the use of any centralized server while still allowing the centralized server to maintain the metadata associated with the assets. Another improvement is that it becomes much easier to expand or otherwise change the storage space used to store assets when the storage space is not as tightly coupled with an asset management system. For example, an additional partition can easily be added to a storage farm without affecting any of the already stored assets. Another improvement is that is becomes easier to share the storage space to used by many different asset management systems. Also, common administrative functions, such as creating backups and archiving assets becomes easier when the assets are not locked up in a storage space tightly controlled by an asset management system. Another advantage is that access to assets may improve because the load can be balanced across various external storage spaces. Additionally, it is possible to make sure that no external storage space gets too full and has its performance negatively affected by not having enough free disk space. Also, since the assets are stored in storage spaces not controlled by asset management systems, it becomes easier to re-partition how the assets are stored, if necessary.

It should be understood that "rendering" may refer to a high quality process of converting an image from a mathematical description of a scene using a program such as RenderMan®. Additionally, "rendering" may refer to any graphical visualization of the mathematical description of the scene, or any conversion of geometry to pixels, for example "rendering" with a lower quality rendering engine, or the like. Examples of low-quality rendering engines include GL and GPU hardware and software renderers, and the like.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system, the method comprising:
   receiving an asset to be stored in an asset management system;
   determining a first location on a storage system external to the asset management system,
   wherein the external storage system is configured to store the asset;
   storing the asset at the first location;
   determining a first logical link to the first location, wherein a logical link is a link between an identifier of the asset and a path to the first location;
   storing the first logical link at a second location on a structured storage managed by the asset management system according to a structure determined by a configuration of the asset management system, wherein the first logical link is accessible via the asset management system;
   determining a second logical link to the first location; and
   storing the second logical link at a third location accessible outside of the asset management system.

2. The method of claim 1 wherein the first storage location is the location where the asset management system would normally store the received asset.

3. The method of claim 1 wherein the storage system external to the storage asset management system is one of a plurality of storage systems within a storage network external to the asset management system.

4. The method of claim 3 wherein the plurality of storage systems external to the asset management system are heterogeneous.

5. The method of claim 1 wherein determining the first location on a storage system external to the asset management system is accomplished using a path determination algorithm.

6. The method of claim 1 wherein each logical link is selected from the group consisting of: a symbolic link, an alias, a shortcut, a pointer, and a uniform resource locator.

7. The method of claim 1 further comprising:
receiving a second asset to be stored in a second asset management system;
determining a fourth location on a storage system external to the second asset management system, wherein the external storage system is configured to store the asset;
storing the asset at the fourth location;
determining a third logical link to the fourth location;
storing the third logical link at a fifth location on a structured storage managed by the second asset management system according to a structure determined by a configuration of the second asset management system, wherein the third logical link is accessible via the second asset management system;
determining a fourth logical link to the fourth location; and
storing the fourth logical link at a sixth location accessible outside of the asset management system;
wherein the second asset management system is different from the asset management system;
wherein the storage system external to the second asset management system comprises the storage system external to the asset management system.

8. A file management system, the system comprising:
an asset management system wherein the asset management system is configured to store assets and to retrieve assets;
a storage network comprising a plurality of storage systems external to the asset management system;
a plurality of client systems configured to store assets to and retrieve assets from the asset management system; and
a computer system configured to recognize when an asset is being added to the asset management system and configured to store assets on the plurality of storage systems on the storage network;
wherein the computer system is configured to receive the asset to be added to the asset management system;
wherein the computer system is configured to determine a location for the asset on one of the plurality of storage systems on the storage network,
wherein the computer system is configured to store the asset at the determined location on one of the plurality of storage systems on the storage network,
wherein the computer system is configured to determine a first logical link to the determined location on one of the plurality of storage systems on the storage network, wherein a logical link is a link between an identifier of the asset and a path to the determined location,
wherein the computer system is configured to store the first logical link at a second location managed by and accessible via the asset management system,
wherein the computer system is configured to determine a second logical link to the determined location on one of the plurality of storage systems on the storage network, and wherein the computer system is configured to store the second logical link at a third location accessible outside of the asset management system.

9. The system of claim 8 wherein the determined location is the location where the asset would have been stored in the asset management system.

10. The system of claim 8 wherein the plurality of storage systems external to the asset management system are heterogeneous.

11. The system of claim 8 wherein determining the location for the asset on one of the plurality of storage systems on the storage network is determined using a path determination algorithm.

12. The system of claim 8 wherein the first and second logical links are each selected from the group consisting of: a symbolic link, an alias, a shortcut, a pointer, and a uniform resource locator.

13. The system of claim 8 wherein the plurality of client systems can access assets stored on plurality of storage systems in the storage network by requesting assets from the asset management system.

14. The system of claim 8 wherein each of the plurality of client systems comprises a client program and a service program, and wherein the client program and service program are configured to allow each of the plurality of clients to access assets stored on the plurality of storage systems without accessing the asset management system.

15. The system of claim 8 further comprising: a second asset management system wherein the second asset management system is configured to store assets and to retrieve assets;
wherein the computer system is configured to recognize when a second asset is being added to the second asset management system;
wherein the computer system is configured to determine a fourth location for the second asset on one of the plurality of storage systems on the storage network,
wherein the computer system is configured to store the second asset at the determined fourth location on one of the plurality of storage systems on the storage network,
wherein the computer system is configured to determine a third logical link to the determined fourth location on one of the plurality of storage systems on the storage network,
wherein the computer system is configured to store the third logical link at a fourth location managed by and accessible via the second asset management system,
wherein the computer system is configured to determine a fourth logical link to the determined fourth location on one of the plurality of storage systems on the storage network,
wherein the computer system is configured to store the fourth logical link at a fifth location accessible outside of the second asset management system; and
wherein the second asset management system is different from the asset management system.

16. A computer program product having a non-transitory computer readable medium storing executable code that is executable by a computer, within the computer includes a processor and a memory, the computer program product comprising:
program code for determining a first location on a storage system external to the asset management system, wherein the external storage system is configured to store the asset, wherein a logical link is a link between an identifier of the asset and a path to the first location;
program code for storing the asset at the first location;
program code for determining a first logical link to the first location;
program code for storing the first logical link at a second location on a structured storage managed by the asset management system according to a structure determined by a configuration of the asset management system, wherein the first logical link is accessible via the asset management system;

program code for determining a second logical link to the first location; and program code for storing the second logical link at a third location accessible outside of the asset management system.

17. The computer program product of claim 16 wherein the first storage location is the location where the asset management system would normally store the received asset.

18. The computer program product of claim 16 wherein the storage system external to the asset management system is one of a plurality of storage systems within a storage network external to the asset management system.

19. The computer program product of claim 18 wherein the plurality of storage systems external to the asset management system are heterogeneous.

20. The computer program product of claim 16 wherein determining the first location on a storage system external to the asset management system is accomplished using a path determination algorithm.

21. The method of claim 1, wherein the asset management system is a database management system, wherein the storage managed by the asset management system is a database, wherein the second location is a database record, the method further comprising:

organizing, as part of receiving the asset to be stored, the asset to be stored as a data unit storable as a file; and updating the database record to indicate the storage of the asset, as part of the determining the first location and the storing the asset at the first location, wherein the storage system is a file system stored on a hard disk array, wherein the first location is a file storage location on the hard disk array, wherein the first location is identifiable by a file path, wherein the third location is a file system directory structure, and wherein the second logical link stored at the third location is a pointer to the file identified by the file path, thereby providing access to the asset, using the logical link, while bypassing the database management system.

22. The file management system of claim 8, wherein the asset management system is a database management system;

wherein the computer system is configured to organize, as part of storing the asset, the asset as a data unit storable as a file; and wherein the one of the plurality of storage systems is a file system stored on a hard disk array, wherein the location on the one of the plurality of storage systems is a file storage location on the hard disk array, wherein the location is identifiable by a file path, wherein the third location is a file system directory structure, and wherein the second logical link stored at the third location is a pointer to the file identified by the file path, thereby providing access to the asset, using the second logical link, while bypassing the database management system.

23. The computer program product of claim 16, wherein the asset management system is a database management system, wherein the storage managed by the asset management system is a database, wherein the second location is a database record, the computer program product further comprising:

code that directs the processor, as part of the code that directs the processor to receive an asset to be stored, to organize the asset to be stored as a data unit storable as a file; and code that directs the processor, as part of the code that directs the processor to determine the first location and the code that directs the processor to store the asset at the first location, to update the database record to indicate the storage of the asset, wherein the storage is a file system stored on a hard disk array, wherein the first location is a file storage on the hard disk array, wherein the first location is identifiable by a file path, wherein the third location is a file system directory structure, and wherein the second logical link stored at the third location is a pointer to the file identified by the file path, thereby providing access to the asset, using the logical link, while bypassing the database management system.

* * * * *